(12) United States Patent
Long et al.

(10) Patent No.: US 11,610,187 B2
(45) Date of Patent: Mar. 21, 2023

(54) PRIVATE LABEL TOKEN PROVISIONING FOR ELECTRONIC PAYMENT TRANSACTION PROCESSING NETWORKS

(71) Applicant: Visa International Service Association, San Francisco, CA (US)

(72) Inventors: Laura Angevine Long, San Mateo, CA (US); Judson Reed, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 102 days.

(21) Appl. No.: 16/710,297

(22) Filed: Dec. 11, 2019

(65) Prior Publication Data

US 2021/0182814 A1    Jun. 17, 2021

(51) Int. Cl.
| | | |
|---|---|---|
| *G06Q 20/10* | (2012.01) | |
| *G06Q 20/36* | (2012.01) | |
| *G06Q 20/40* | (2012.01) | |
| *G06Q 20/20* | (2012.01) | |
| *G06Q 20/38* | (2012.01) | |

(52) U.S. Cl.
CPC ........... *G06Q 20/105* (2013.01); *G06Q 20/20* (2013.01); *G06Q 20/3672* (2013.01); *G06Q 20/3674* (2013.01); *G06Q 20/385* (2013.01); *G06Q 20/401* (2013.01)

(58) Field of Classification Search
CPC .. G06Q 20/105; G06Q 20/322; G06Q 20/326; G06Q 20/36; G06Q 40/02
See application file for complete search history.

(56) References Cited

U.S. PATENT DOCUMENTS

| | | | |
|---|---|---|---|
| 8,224,754 B2 | 7/2012 | Pastusiak | |
| 2009/0254462 A1* | 10/2009 | Tomchek | G06Q 40/00 |
| | | | 705/30 |
| 2014/0358656 A1* | 12/2014 | Poole | G06Q 30/0215 |
| | | | 705/14.17 |
| 2015/0032627 A1* | 1/2015 | Dill | G06Q 20/40 |
| | | | 705/44 |
| 2017/0061428 A1* | 3/2017 | Prabhu | G06Q 50/01 |
| 2019/0034924 A1* | 1/2019 | Prabhu | G06Q 20/3821 |
| 2019/0080316 A1 | 3/2019 | Douglas | |
| 2019/0122209 A1* | 4/2019 | Shah | H04L 9/3213 |
| 2019/0156335 A1 | 5/2019 | Safak | |

* cited by examiner

*Primary Examiner* — Eric T Wong
(74) *Attorney, Agent, or Firm* — Schwabe, Williamson & Wyatt, PC

(57) ABSTRACT

Embodiments include apparatuses, methods, and systems for an example token provisioning process. In embodiments, a server computer device may receive over a payment transactions network, a request from an issuer for a private label (PL) token associated with a primary account number (PAN) of a payment card and a partnership offer between a partner merchant and the issuer. In embodiments, the server computer device, may generate and/or activate the PL token. In embodiments, the PL token is provisioned at a first level according to, at least, product characteristics associated with the PAN and at a second level according to, at least, product characteristics associated with the partnership offer. Other embodiments may also be described and claimed.

18 Claims, 6 Drawing Sheets

PRIVATE LABEL TOKEN PROVISIONING FOR ELECTRONIC PAYMENT TRANSACTION PROCESSING NETWORKS

BACKGROUND

Electronic payment transaction processing networks facilitate billions of electronic payment transactions annually among consumers, merchants, processors, banks, and/or other relevant parties. Various transactions, however, are more complex than others to process. For example, special agreements or offers from issuing banks may include varying terms, e.g., customized or promotional financing terms and/or different interchange arrangements between parties, and thus require specialized processing. In such cases, in order to complete processing, the institutions involved may take the payment transaction off the network (e.g., process the transaction separately from the normal flow of electronic payment transactions processing). Off-network processing, however, can be expensive and complex, and especially so when agreements involve multiple merchants or institutions.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
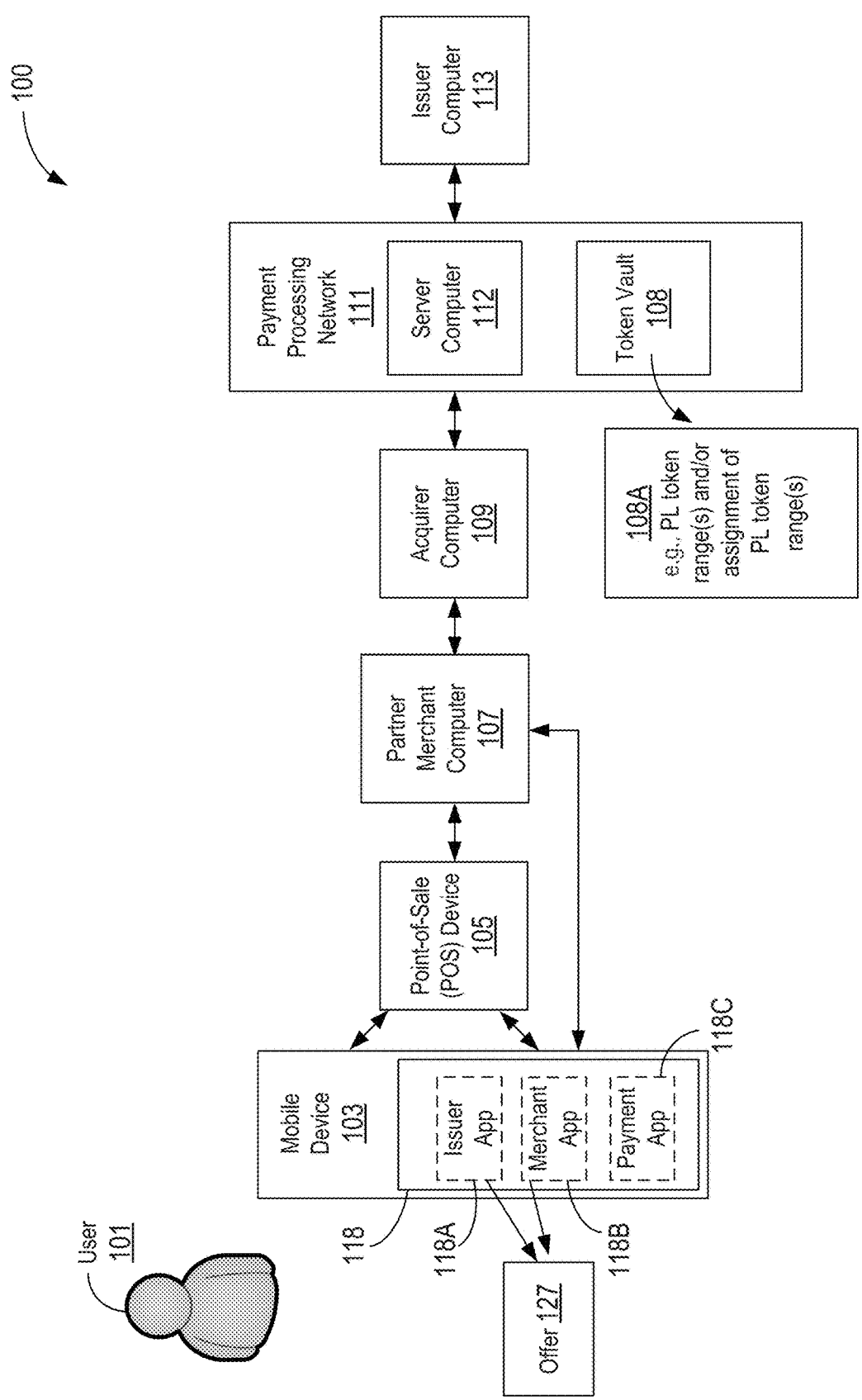
FIG. 1 is a simplified block diagram illustrating an environment 100 associated with an electronic payment transactions processing network, in accordance with embodiments.

The following description is presented to enable one of ordinary skill in the art to make and use the embodiments and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the current disclosure. Various embodiments will also be described in the context of particular methods having certain steps. However, the method and system operate effectively for other methods having different and/or additional steps and steps in different orders that are not inconsistent with the presented embodiments. Thus, the current disclosure is not intended to be limited to the embodiments shown, but is to be accorded the widest scope consistent with the principles and features described herein.

As used herein, the term "comprising" is not intended to be limiting, but may be a transitional term synonymous with "including," "containing," or "characterized by." The term "comprising" may thereby be inclusive or open-ended and does not exclude additional, non-recited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

In the following description and claims, the terms "coupled" and "connected," may be used. The term "coupled" may be used to indicate that two or more elements, which may or may not be in direct physical or electrical contact with each other, co-operate or interact with each other. The term "connected" may be used to indicate the establishment of communication between two or more elements that are coupled with each other.

As used herein, a "mobile device" may comprise any electronic and/or communication device that may be transported and operated by a user (also referred to interchangeably as "consumer"). In some embodiments, the mobile device may serve as a payment device. Examples of mobile devices include mobile phones (e.g., cellular phones), personal digital assistants (PDAs), tablet computers, laptop computers (e.g., netbooks), personal music players, handheld electronic reading devices, wearable computing devices, etc.

A "server computer" or "server computer device" may be a powerful computer or combination of two or more computers. For example, the server computer can be a large mainframe, a minicomputer cluster, or a group of servers functioning as a unit such as a cluster. In one example, the server computer may be a database server coupled to a web server. Server computers often execute server applications that act as a server in client-server interactions, including but not limited to database server applications, web server applications, application server applications, etc.

As used herein, a "communications channel" may refer to any suitable path for communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a Secure Sockets Layer (SSL) session. However, any method of creating a secure channel may be used. By establishing a secure channel, sensitive information related to a payment device (such as account number, Card Verification Value (CVV) values, expiration dates, etc.) may be securely transmitted between the two entities to facilitate a transaction.

As used herein, a PAN (Primary Account Number or "account number") includes account identification information and may include any suitable information associated with an account (e.g., a payment account of a credit card and/or payment device associated with the payment account).

As used herein, a bank identification number (BIN) may include the initial four to six numbers (or other identifying numbers) that appear on a payment card, e.g., credit card. The bank identification number identifies the issuer of the credit card.

As used herein, a "token" may include an identifier for a payment account that is a substitute for other data. A token may include, for instance, a series of alphanumeric characters that may be provisioned according to embodiments that are discussed further below.

An "issuer" or "issuer entity" may refer to a business entity (e.g., a bank) that issues credit associated with a payment card and/or maintains financial accounts for users and may issue payment credentials to be stored on a mobile device of a user.

As used herein, a "merchant" is typically an entity that engages in transactions and may sell goods and/or services. In embodiments of the disclosure, "merchant" is referred to interchangeably sometimes with "partner merchant" where the merchant has partnered with an issuer to provide a user or consumer with an offer (also "partnership offer"), e.g., an offer that provides promotional, customized, or special financing terms to the consumer or user.

As used herein, an "acquirer" (also referred to as "acquiring entity") includes a business entity (e.g., a bank or other financial institution) that has a business relationship with the merchant or other entity. Some entities can perform both issuer and acquirer functions, and some embodiments may encompass such single entity issuer-acquirers.

As used herein, an "app" is used herein as that term is known, to refer to an application for a mobile device. An app, or mobile app, is a software application designed to run on, for example, smartphones, tablet computers, and other mobile devices.

As used herein, a point-of-sale (POS) device includes any suitable electronic device used to access or read information from a user or customer's payment card at retail locations. For example, a POS device may include register, square device, credit card reader, tablet device, and the like.

In embodiments, methods, systems, and apparatuses are described that include receiving by a server computer device, over an electronic payment transactions processing network, a request from an issuer for a private label (PL) token associated with a primary account number (PAN) of a payment card and a partnership offer between a partner merchant and the issuer. In embodiments, the method further includes activating, by the server computer device, the PL token. In embodiments, the PL token is provisioned at a first level according to, at least, product characteristics associated with the PAN and further provisioned at a second level according to, at least, product characteristics associated with the partnership offer. In embodiments, after the activation, the server computer device, may notify the partner merchant and the issuer of activation of the PL token to identify the partnership offer. In embodiments, the PL token is able to convey information about the partnership offer to the entities involved without disrupting business-as-usual (BAU) processes. For example, credit terms associated with a purchase may be made visible to both an issuer and an acquirer during a substantially BAU payment transaction. Embodiments may be implemented using a payment transaction environment (as illustrated in FIG. 1 below).

FIG. 1 illustrates a simplified block diagram including entities in an electronic payment transactions environment 100, according to embodiments. This depicted payment transaction environment 100 includes a consumer or user 101, a mobile device 103, a point-of-sale (POS) device 105, a partner merchant computer or merchant computer device 107, an acquirer computer 109, an electronic payment transactions processing network 111 ("payment processing network 111"), and an issuer computer device 113. In embodiments, POS device 105 is communicatively coupled between mobile device 103 of user 101 and merchant computer 107, which may in turn be communicatively coupled to acquirer computer 104. In embodiments, acquirer computer 109 may be communicatively coupled to issuer computer 113 via payment processing network 111. Note that each of the entities (e.g., merchant computer 103, acquirer computer 109, payment processing network 111, and issuer computer 106) may comprise one or more computer apparatuses to enable communications or to perform one or more of the functions described herein. In embodiments, some or all of these entities depicted as communicatively coupled may be connected across one or more communication networks or may be directly connected.

As shown, in embodiments mobile device 103 includes mobile applications 118 which may include, for example, an issuer application (or "issuer app") 118A, merchant application ("merchant app") 118B, and a payment application ("payment app") 118C. Note that, in embodiments, payment app 118C includes a mobile digital wallet. In embodiments, a mobile digital wallet may contain information for processing payments from payment cards (e.g., credit cards, debit cards, prepaid cards, etc.). Mobile device 101 may interact with an access device (e.g., POS 105 which may utilize contactless payment technology) and/or directly with merchant computer 107 (e.g., via the Internet to access a website or utilize an application provided by merchant computer 107) to initiate and/or conduct a purchase or other financial transaction.

Payment processing network 111 may include data processing subsystems, networks, and operations used to support and deliver certificate authority services, authorization services, exception file services, and clearing and settlement services. An exemplary payment processing network may include VisaNet™. Payment processing networks such as VisaNet™ are able to process credit card transactions, debit card transactions, digital wallet transactions, and other types of commercial transactions. VisaNet™, in particular, includes a VIP system (Visa Integrated Payments system) that processes authorization requests and a Base II system that performs clearing and settlement services. In some embodiments, electronic payment transactions processing network 111 may conduct transactions in substantially real-time (e.g., in fewer than a few seconds or fractions of a second). The payment processing network 111 may include one or more server computer device(s) (as described above). Payment processing network 111 may use any suitable wired or wireless network, including the Internet.

Note that in some embodiments, the payment processing network includes a closed-loop network. In some embodiments, an example of a closed-loop network includes a payment processing network dedicated to a single partner merchant (e.g., a payment processing network for processing purchases made at a single merchant rather than a plurality of merchants).

Furthermore, as shown, in embodiments, payment processing network 111 includes a token vault 108. As will be discussed in more detail with respect to FIG. 2, in embodiments, token vault 108 includes a secure location for storage of values associated with a token range, e.g., a PL token range and/or assignment of a PL token range. In embodiments, token vault 108 includes values 108A associated and/or correlated with a file such as, e.g., an account range definition (ARDEF) file. In embodiments, the ARDEF file includes product characteristics of a financial product, such as offer 127 that is associated with a private label (PL) token. In embodiments, token vault 108 includes a secure storage that may include or be communicatively coupled to a server computer 112.

As will be discussed further below, in embodiments, consumer 101 uses or operates a mobile device 103 that receives an offer 127, e.g., an offer for a financial product to be used to finance a purchase from the merchant or partner merchant. In embodiments, offer 127 is from an issuer who has partnered with the merchant associated with merchant computer 107. In embodiments, the user can take advantage of the offer to make a purchase from the merchant using promotional credit terms, such as, e.g., a special interest rate or installment-type payments for the purchase amount. In some embodiments, rather than being received at mobile device 103, the offer is received by the user at POS device 105. In embodiments, special agreements or offers (e.g., partnership or other offers) that include customized or varying terms and/or different interchange arrangements between parties can be processed without requiring that one or more institutions involved take the payment transaction off the network. In some embodiments, off-network processing, which can be expensive and complex, can be avoided by conveying valuable information via multiple levels of tokenization.

Figure 2:
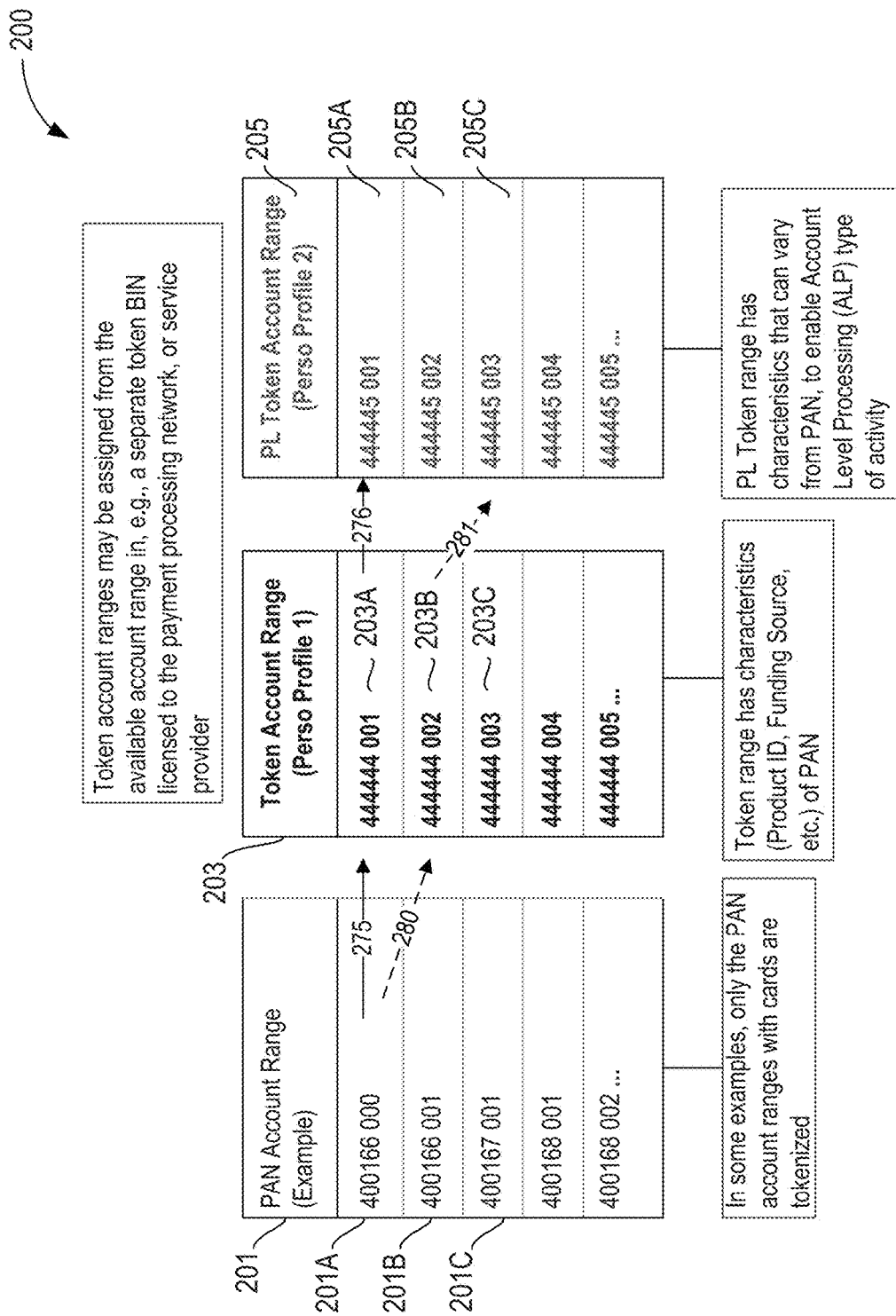
FIG. 2 is a diagram 200 illustrating an example assignment or mapping of token account ranges associated with a private label (PL) token provisioning process, in accordance with embodiments.

Next, FIG. 2 is a diagram 200 illustrating an example assignment or mapping of token account ranges associated with a private label (PL) token provisioning process, in accordance with embodiments. In embodiments, the assignment or mapping of token account ranges may replace more complex account-level processing (e.g., processing each transaction by single account or PAN). As noted above, token vault 108 includes a secure location for storage of values (e.g., values 108A of FIG. 1) associated with a PL token range. In embodiments, the values are included in an assignment of token account ranges where a single primary account number (PAN) range is mapped to at least two or more token ranges. In embodiments, at least one token range is a private label (PL) token range. Accordingly, FIG. 2 includes a first column illustrating a plurality of payment card identifier ranges, e.g., a plurality of PAN account ranges 201, a second column illustrating a first plurality of token account ranges 203, and a third column illustrating a second plurality of token account ranges, e.g., PL token account range 205, that may be associated with financial products of a PL partnership agreement. Note that in some embodiments, only PAN account ranges with issued cards are tokenized.

As shown, in embodiments, an example PAN account range 201A may include payment accounts that begin with the first nine digits "400166 000." An example PAN account range 201B may include substantially all payment accounts that begin with the first nine digits "400166 001." Accordingly, an example PAN account range 201C may include payment accounts that begin with the first nine digits "400167 001." A similar pattern may follow for the remaining PAN account ranges (note that PAN's typically include 16 digits). In embodiments, first plurality of token account ranges 203 of the second column is associated with a first personal profile ("perso profile"). In embodiments, the first perso profile has characteristics such as financial product identification (ID) (e.g., financial product ID such as type of credit card issued, etc.), and funding source, etc., of the PAN. In embodiments, a first token account range 203A may include all token accounts that begin with the first nine digits "444444 001." Token account range account range 203B may include all payment accounts that begin with the first nine digits "444444 002" Accordingly, token account range 203C may include all payment accounts that begin with the first nine digits "444444 003," and so forth, for the remaining token account ranges.

In embodiments, second plurality of token account ranges 205 of the third column includes a plurality of Private Label (PL) token account ranges. In embodiments, each of the token account ranges are associated with a second perso profile. In embodiments, the second perso profile includes details related to financial products of a PL partnership agreement. In embodiments, each token account range includes a plurality of token accounts or unique PL tokens.

Accordingly, note that in embodiments, a PL token included in the PL token account range is provisioned at a first level, according to, at least, product characteristics associated with the PAN and further provisioned at a second level according to, at least, product characteristics associated with the partnership offer. In embodiments, the first level corresponds to a first token account range associated with a first personalization profile and the second level includes a second token account range associated with a second personalization profile. In embodiments, as shown by the solid arrows (275, 276) and dashed arrows (280, 281), a PAN account range (and thus individual PAN account in the account range) may correlate to any one of the plurality of token account ranges (and thus individual token or token account in the token account range) as shown the example second column. In turn, in embodiments, a token account range of second column 203 may correlate to any one (or more) of the second plurality of PL token account range (and thus individual PL token account in the PL token account range) of the example third column.

Note that although only two provisioning levels are shown for simplicity, the PL token may be provisioned according to multiple levels. In various embodiments, the first provisioning level and the second provisioning level are selected from a plurality of provisioning levels and the first and the second personalization profiles are selected from a plurality of personalization profiles.

In embodiments, a token or PL token may be a series of alphanumeric characters that may be provisioned according to embodiments that are discussed herein. Note that the example token assignment and mapping above as well as account ranges and alphanumeric characters in FIG. 2 are merely examples. In some embodiments, a token or PL token may have a numeric format that conforms to the account identifiers used in existing payment processing networks. In some embodiments, the token may comprise the some of the same elements in the same order as a PAN. In other embodiments, the token may be of the same size as a PAN, but may include different elements or differently sized elements In some embodiments, a token value may be generated such that the original PAN or other account identifier associated with the token value may not be computationally derived solely from the token. For example, a token may comprise a randomly generated value associated with an original PAN in a lookup table, so that the token cannot be decrypted, reformatted, or otherwise reverse-engineered to determine the original PAN. Rather, in some embodiments, direct or indirect knowledge of the lookup table may be the only way to determine the original PAN corresponding to the token. As noted above, an entity or secure storage associated with or included at the entity, and as discussed further below, that maintains the aforementioned lookup table may be referred to as a "token vault."

Figure 3:
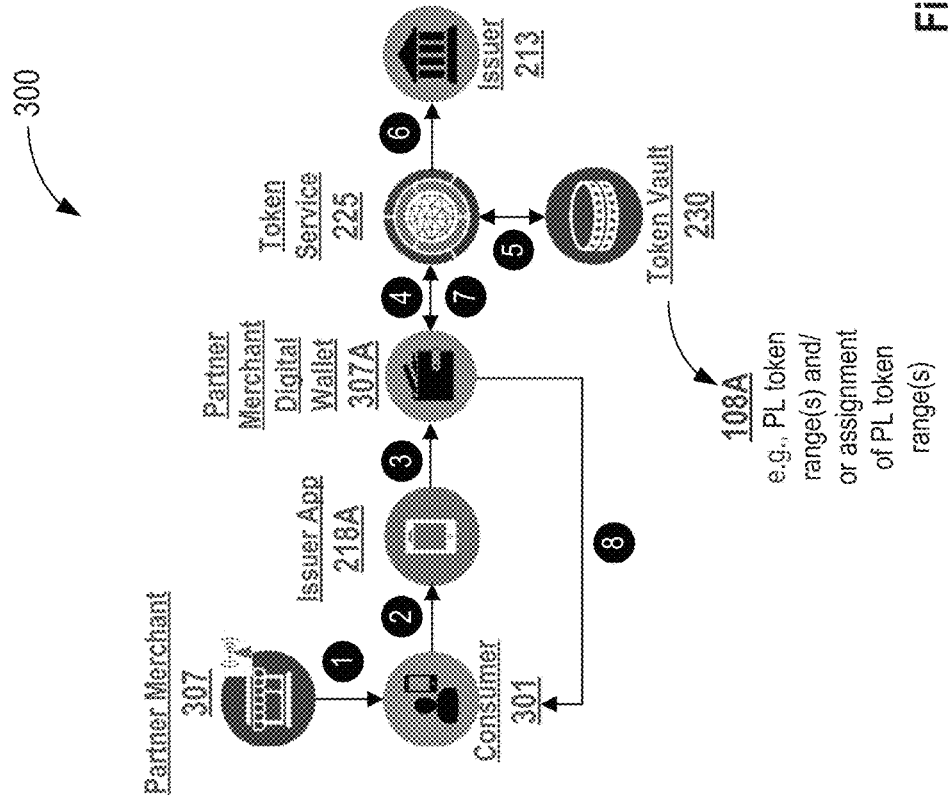
FIG. 3 is a diagram 300 illustrating an example process associated with a token provisioning process, in accordance with embodiments.

FIG. 3 is a diagram 300 illustrating an example process associated with a token provisioning process, in accordance with embodiments. As shown, diagram 300 is accompanied by a process flow description 300A. In embodiments, diagram 300 includes a merchant or partner merchant 307, consumer 301, issuer app 218A (e.g., similar or the same as issuer app 118A of FIG. 1), partner merchant digital wallet 307A ("partner merchant wallet"), a token service 225 (e.g. included in a payment processing network), token vault 230, and an issuer 213. In embodiments, consumer 301 may be the similar or same as user or consumer 101 who operates mobile device 103 of FIG. 1.

To begin, as indicated at arrow 1 of diagram 300 and corresponding process flow description 300A, consumer 301 may be notified that partner merchant 307 is extending an offer that includes a special partnership value (e.g., partnership offer or offer 127 of FIG. 1). As noted above, in embodiments, consumer 301 may receive the offer via mobile device 103. Note that the consumer 301 may be notified via email, via website of partner merchant or payment card (issuer card, e.g., general purpose issuer), text message, or any suitable electronic means. In order to take advantage of the offer, consumer 301 may request a special token for use at a location of partner merchant 307. Thus, e.g., at arrow 2, as shown in the embodiment, consumer 301 opens (and/or downloads) issuer app 218A on mobile device 103. In embodiments, consumer 301 uses issuer app 218A to request a special or PL token e.g. as included in a PL token range (e.g., 205A-205C of FIG. 2). In the embodiment, consumer 301 may authenticate into issuer app 218A and provides any secondary information, as appropriate or necessary. Accordingly, consumer 301 logs into issuer app 218A and completes authentication.

Next, for the embodiment shown, e.g., at arrow 3, issuer app 218A generates a send request to, e.g., partner merchant digital wallet 307A to request a unique private label (PL) token. In embodiments, the unique PL token includes a PL token that is similar or the same as described as included in the PL token ranges of FIG. 2. In embodiments, in response, at arrow 4, partner merchant digital wallet 307A forwards or sends the request to token service 225. Note that in embodiments, token service 225 includes a token service such as Visa Token Service™ associated with a payment processing network 111 of FIG. 1. At arrow 5, in embodiments, token service 225 may validate the request, and generate (and/or select if already generated) a PL token from the PL token account range (e.g., one or more of PL token ranges 205A-205D of FIG. 2). Next at arrow 6, token service 225 sends a notification to issuer 213 and at arrow 7, to partner merchant digital wallet 307A to activate the PL token on mobile device, e.g., mobile device 103. Finally, in the embodiments, at arrow 8, partner merchant 307 via partner merchant digital wallet 307A then activates the PL token on the mobile device. Consumer receives message that credit card of issuer 213 is ready to pay.

Note that in embodiments, partner merchant 307 may be a partner merchant selected from a plurality of partner merchants on the payment transactions network. In other embodiments, the payment transactions network may include a payment processing network that includes only a single merchant (e.g., a closed-loop network).

Figure 4:
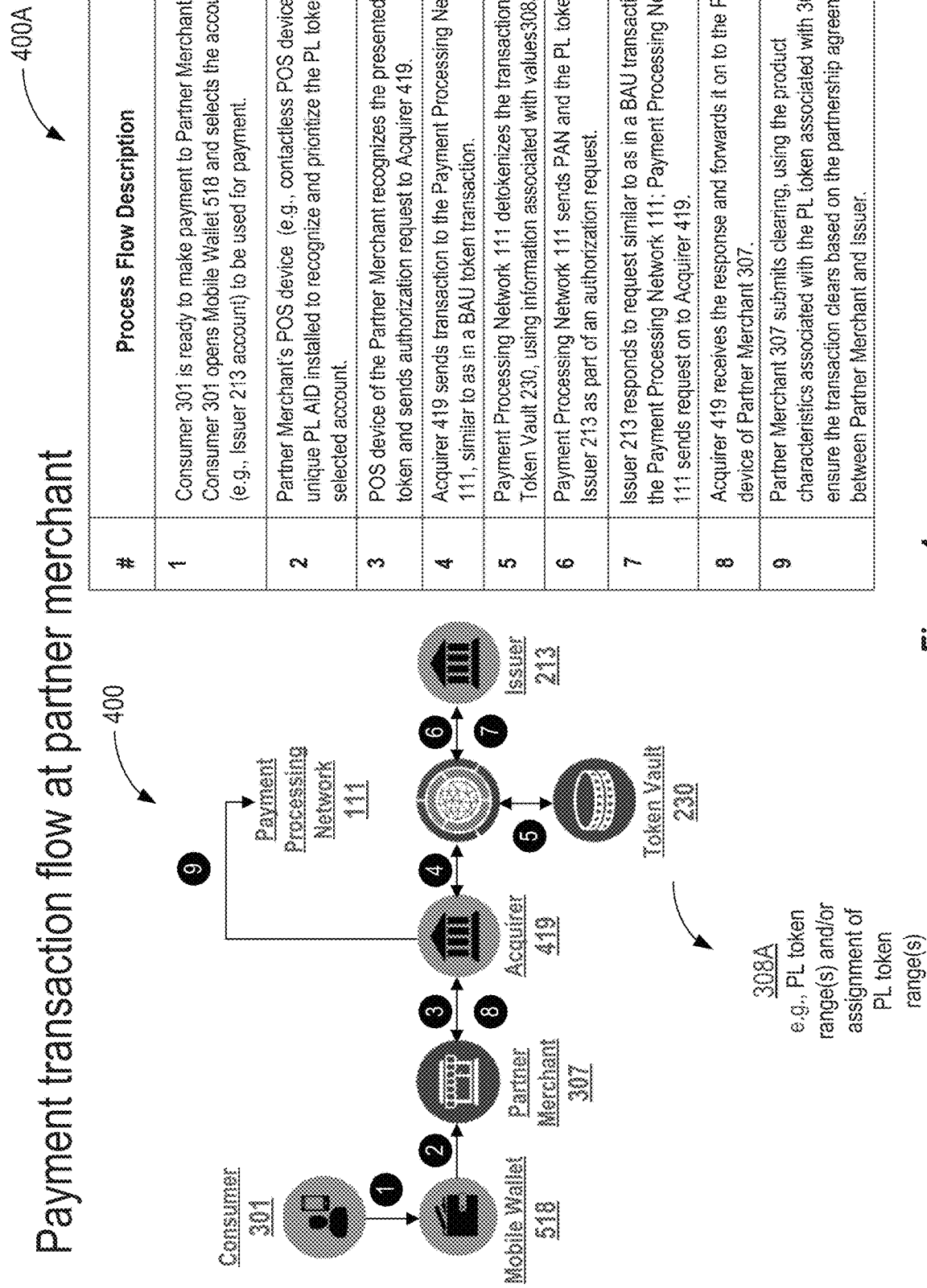
FIG. 4 is a diagram 400 illustrating an example payment transaction flow that may follow the process of FIG. 3, in accordance with embodiments.

Next, FIG. 4 is a diagram 400 illustrating an example payment transaction flow that may follow the process described in FIG. 3, in accordance with embodiments. As shown, diagram 400 is accompanied by a process flow description 400A. In embodiments, at arrow 1, consumer 301 is ready to make payment to partner merchant 307. In the embodiments, the PL token is presented by the mobile device of consumer 301. In embodiments, consumer 301 opens mobile wallet 518 on the mobile device and selects an account (e.g., specifically, the issuer account associated with Issuer 213) to be used for payment. At arrow 2, a POS device of partner merchant 307 (e.g. POS device 102 of FIG. 1) has a unique private label account identification (PL AID) installed to recognize and prioritize the PL token for the selected account. The POS of the Partner Merchant 307 recognizes the presented PL token and at arrow 3, sends authorization request to acquiring entity or acquirer 419. As shown, at arrow 4, acquirer 419 sends transaction details to the payment processing network 111, similar to as it would in a BAU token transaction. Note that an account of Acquirer associated with Partner Merchant 307 will ultimately receive the funds for the transaction from Issuer 213 on behalf of consumer 301.

In embodiments, however, unlike in a BAU token transaction, financial product details conveyed by the PL token are visible to acquirer 419. Note that in embodiments, acquirer 419 may receive a PL token identification in a field (e.g., field 62.23 of the authorization response) and will be able to use the information associated with the ARDEF, e.g., similar or the same as ARDEF associated with values stored in token vault 230, to clear and settle the transaction for daily reconciliation with partner merchant 307.

In the embodiment, payment processing network 111 detokenizes the transaction using information (e.g., values 108A of FIG. 1 associated with token ranges, in turn, associated with a relevant ARDEF file). At arrow 6, in the embodiment, payment processing network 111 may send the PAN and the PL token to issuer 213 as part of an authorization request. At arrow 7, issuer 213 responds to the authorization request similar to as in a BAU transaction from payment processing network 111. Accordingly, in the embodiment, payment processing network 111 sends authorization request on to acquirer 419. In embodiments, at arrow 8, acquirer 419 receives the response and forwards it on to the POS device of partner merchant 307. Finally, at arrow 9, in the embodiment, partner merchant 307 may submit information about the clearing to payment processing network 111, using product characteristics associated with the PL token as taken from the ARDEF file to ensure the transaction clears based on terms in, e.g., the partnership agreement (associated with the offer) between partner merchant 307 and issuer 213.

Figure 5:
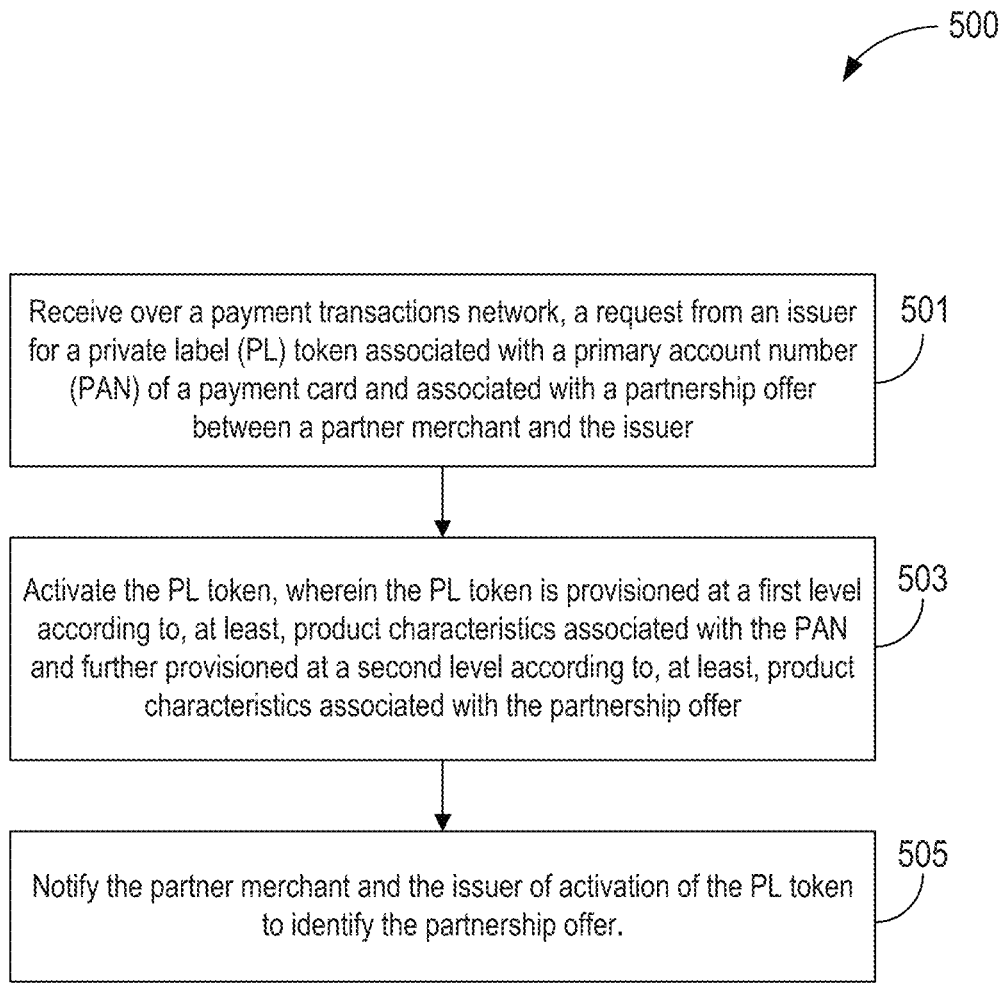
FIG. 5 is a flow diagram 500 illustrating an example process associated with FIGS. 1-4, in accordance with embodiments.

Referring now to FIG. 5, which is a flow diagram describing process 500, associated with the token provisioning process associated with FIGS. 1-4 above. In embodiments, process 500 may be performed by, e.g., a server computer device included in a payment processing network, e.g., payment processing network 111 of FIG. 1. In embodiments, process 500 includes, at 501, receiving over the payment transactions network, a request from an issuer for a private label (PL) token associated with a primary account number (PAN) of a payment card and a partnership offer between a partner merchant and the issuer. In embodiments, the request from the issuer may include a request originating from an issuer app of a mobile device of the consumer.

Next, in the embodiment, at block 503, after receiving the request, process 500 includes activating the PL token, wherein the PL token is provisioned at a first level according to, at least, product characteristics associated with the PAN and further provisioned at a second level according to, at least, product characteristics associated with the partnership offer. In embodiments, at a block 505, process 500 includes notifying the partner merchant and the issuer of activation of the PL token to identify the partnership offer. Note that the partnership offer may include, e.g., a customized agreement between the partner merchant and the issuer including promotional credit terms for a consumer associated with the payment card.

Although not shown in FIG. 5, process 500 may further include a payment transactions process similar to that as described in connection with FIG. 4. In embodiments, process 500 may include receiving over the payment transactions network, a request from an acquiring entity (e.g., acquirer 419 of FIG. 4) to authorize, clear, and settle a transaction using the PL token as part of a business-as-usual (BAU) request. In some embodiments, process 500 may further include accessing a token vault included at the payment processing network, and detokenizing the transaction. In embodiments, the first personalization profile may include product characteristics associated with the PAN including at least a product identification and funding source of the payment card and the second personalization profile includes at least product characteristics associated with the partnership offer including identification and credit terms of the partnership offer.

In embodiments, a PL token range and/or assignment of PL token range(s), and/or other values associated with an account range definition (ARDEF) file including the product characteristics associated with the PAN and the partnership offer is stored in a token vault of the payment transactions network. In some embodiments, the ARDEF file or a similar ARDEF file associated with the PL token is stored at the acquiring entity. In embodiments, a payment transactions flow similar to that described in connection with FIG. 4 (e.g., arrows 4-9) may occur, and finishing with the partner merchant submitting confirmation/information about the clearing using the product characteristics associated with the PL token from an ARDEF file associated with values 308A to ensure the transaction clears based on the partnership agreement between the partner merchant and issuer.

Figure 6:
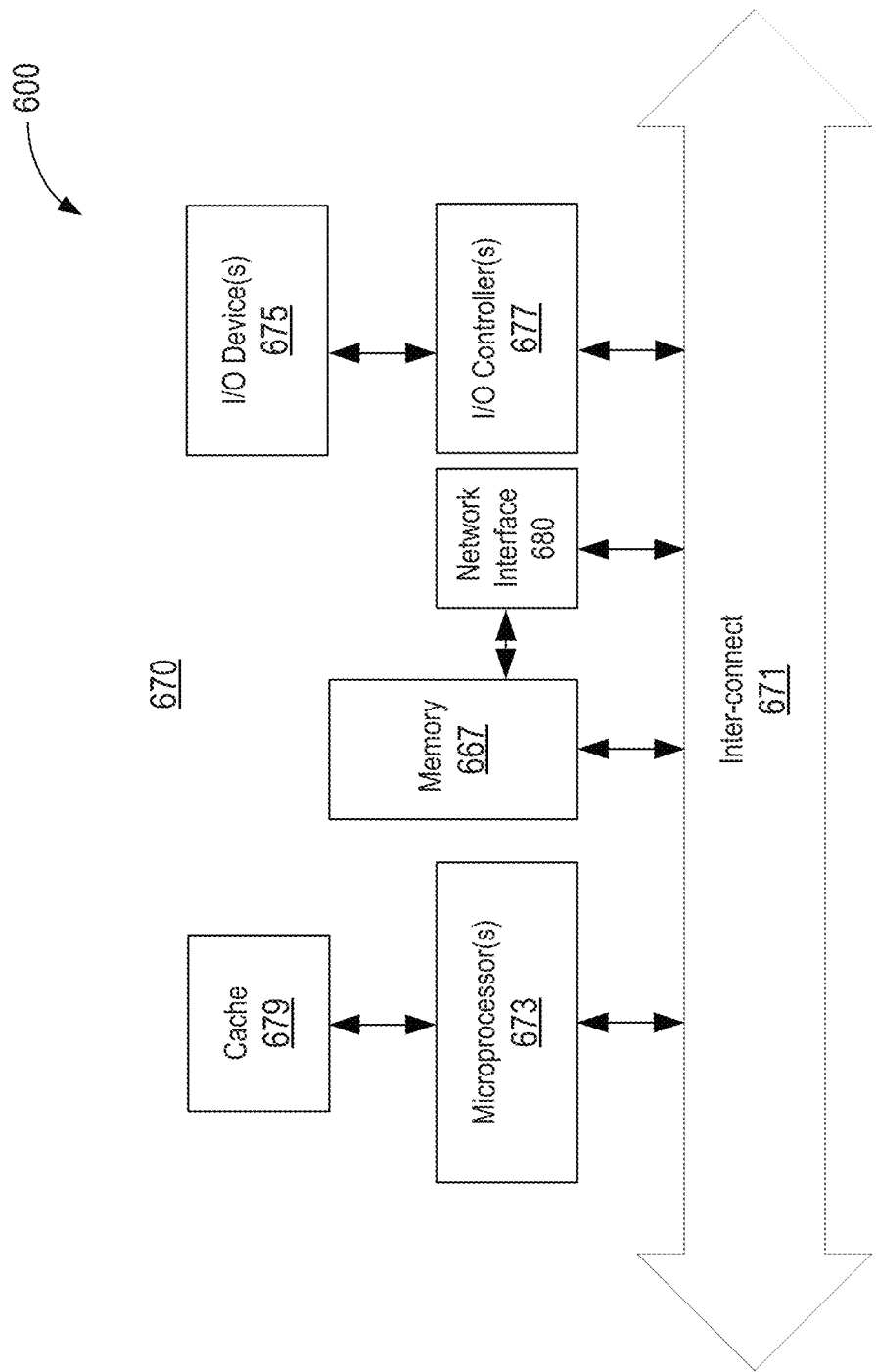
FIG. 6 is an example computer system, suitable for use to practice various aspects of the present disclosure, in accordance with various embodiments.

FIG. 6 illustrates an example computer device or system suitable for use to practice various aspects of the present disclosure, in accordance with various embodiments. While FIG. 6 illustrates various components of a computer system, it is not intended to represent any particular architecture or manner of interconnecting the components. One embodiment may use other systems that have fewer or more components than those shown in FIG. 6.

In FIG. 6, the data processing system 670 includes an inter-connect 671, e.g., bus and system core logic, which interconnects a microprocessor(s) 673, memory 667, and input/output (I/O) device(s) 675 via I/O controller(s) 677. The microprocessor 673 is coupled to cache memory 679. I/O devices 675 may include a display device and/or peripheral devices, such as mice, keyboards, modems, network interfaces, printers, scanners, video cameras and other devices known in the art. In one embodiment, when the data processing system is a server system, some of the I/O devices 675, such as printers, scanners, mice, and/or keyboards, are optional.

In one embodiment, the inter-connect 671 includes one or more buses connected to one another through various bridges, controllers and/or adapters. In one embodiment the I/O controllers 677 include a USB (Universal Serial Bus) adapter for controlling USB peripherals, and/or an IEEE-1394 bus adapter for controlling IEEE-1394 peripherals.

In one embodiment, the memory 667 includes one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface 680 such as a modem or Ethernet interface, can also be used. In some embodiments, a non-volatile memory includes a secure storage that is included or includes, e.g., a token vault such as token vault 230. In embodiments, network interface 680 may also include, e.g., network interface cards, infrared receivers, radio receivers (e.g., Bluetooth), and so forth.

In this description, some functions and operations are described as being performed by or caused by software code to simplify description. That is, the techniques may be carried out in a computer system or other data processing system in response to its processor, such as a microprocessor, executing sequences of instructions contained in a memory, such as ROM, volatile RAM, non-volatile memory, cache or a remote storage device.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

Accordingly, as shown above, FIG. 6 may include a system for a payment transactions network, including a network interface to receive, a request for a private label (PL) token associated with a partnership offer between a partner merchant and an issuer. In embodiments, the system includes or is coupled to a storage to store first and second token ranges corresponding to first and second provisioning levels of the private label (PL) token. The system may include a token activator to be operated by one or more processors and coupled to the network interface to receive the request. In embodiments, the token activator may be coupled to the storage to activate the PL token, wherein the PL token is provisioned at both the first and second provisioning levels according to product characteristics associated with a primary account number of a payment card and product characteristics of the partnership offer. In embodiments, the token activator is further to notify, via the network interface, the partner merchant and the issuer of activation of the PL token, wherein upon the notification, the PL token identifies the partnership offer to the partner merchant and the issuer entity due to the provisioning. In embodiments, the system or server computer device is to establish a secure channel (e.g., similar to as described in connection with paragraph [014]) over the payment transactions network and wherein the request for the PL token is received from via a partner digital wallet of the partner merchant over the secure channel.

In embodiments, the system is to receive via the network interface, a request from an acquiring entity to process a payment transaction using the PL token as part of a business-as-usual (BAU) request and is to identify the partnership offer via the first and second provisioning levels of the PL token. In embodiments, the request from the acquiring entity is in response to an authorization request received by the acquiring entity from a point-of-sale (POS) device of the merchant. In some embodiments, the authorization request received by the acquiring entity from a point-of-sale (POS) device is based at least in part on a unique private label identification (PLAID) to enable the POS device to recognize the PL token.

In embodiments, a storage medium may store instructions for practicing methods described with references to FIGS. 1-5, in accordance with various embodiments. For example, a non-transitory computer-readable storage medium may include a number of programming instructions. Programming instructions may be configured to enable a device, e.g., server computer device 112, POS device 105, or other computer devices of FIG. 1, in response to execution of the programming instructions, to perform, e.g., various operations associated with a token assignment, mapping, or PL provisioning process of FIGS. 2 and 3, associated payment transactions processes (e.g., FIG. 5) and/or other operations described herein.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

The non-transitory computer-readable storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of disclosed features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The invention claimed is:

1. A computer-implemented method for improving processing of payment transactions involving partnership offers by a server computer device, the partnership offers indicating transaction customized or varying terms, different interchange arrangements between parties, or enabling installment type payments to consumers, the payment transaction processing to process the payment transactions involving the partnership offers without first requiring the payment transactions to be taken off the payment processing network, the method comprising:
  storing, by a server computer device, in a storage device communicatively coupled to a payment transactions network, a private label (PL) token range assignment file that maps a single primary account number (PAN) range to at least two or more token ranges, the PL token range assignment file comprising:
    a plurality of primary account number (PAN) ranges,
    a first plurality of token account ranges mapped to the plurality of primary PAN ranges, the first plurality of token account ranges associated with first product characteristics comprising the financial product identification (ID); and a second plurality of token account ranges mapped to the first plurality of token account ranges, the second plurality of token account ranges associated with second product characteristics including a private label (PL) partnership offer;

correlating a PAN account range of the plurality of primary PAN ranges to any one of the first plurality of token account ranges;

correlating a token account range of the first plurality of token account ranges to any one of the second plurality of token account ranges;

receiving, by the server computer device, over the payment transactions network, a request for a private label (PL) token to be used for a payment transaction associated with a primary account number (PAN) of a payment card and the PL partnership offer between a partner merchant and the issuer, the request originating from an issuer application executing on a mobile device of a consumer;

retrieving, by the server computer device from the storage device, a first value from the plurality of primary PAN ranges in the PL token range assignment file based on the PAN;

retrieving, by the server computer device from the storage device, a second value from the first plurality of token account ranges in the PL token range assignment file based on the first value;

retrieving, by the server computer device from the storage device, a third value from the second plurality of token account ranges in the PL token range assignment file based on the second value;

generating, by the server computer device, a PL token from at least the first value, and the second value to provision the PL token at multiple levels according to at least the first product characteristics and the second product characteristics; and notifying, by the server computer device, the partner merchant and the issuer of the PL token so that the partner merchant activates the PL token on the mobile device through a partner merchant digital wallet, the PL token identifying the partnership offer to parties of the payment transaction;

receiving, by the server computer device, an authorization request generated once the consumer initiates a payment transaction with the partner merchant using the payment card of the issuer, the authorization request including the PAN and the PL token;

forwarding, by the server computer device, the authorization request to a POS device of the partner merchant; and receiving, by the server computer device, clearing information including product characteristics associated with the PL token to clear the payment transaction based on terms in the partnership agreement between partner merchant and the issuer, such that the payment transaction from the POS device is processed without removal of the payment transaction from the payment transactions network.

2. The computer-implemented method of claim 1, further comprising associating the first plurality of token account ranges with a first personalization profile that includes the first product characteristics associated with the PAN including at least the financial product identifier and a funding source of the payment card, and associating the second plurality of token account ranges with a second personalization profile that includes at least the second product characteristics associated with the PL partnership offer including identification and credit terms of the partnership offer.

3. The computer-implemented method of claim 2, further comprising storing values associated with an account range definition (ARDEF) file including the first product characteristics associated with the PAN and the second product characteristics associated with PL partnership offer in a token vault communicatively coupled to the payment transactions network.

4. The computer-implemented method of claim 3, further comprising storing the ARDEF file or a file similar to the ARDEF file associated with the PL token at an acquiring entity.

5. The computer-implemented method of claim 3, further comprising:
accessing, by the server computer device, the token vault; and
detokenizing, by the server computer device, the transaction.

6. The computer-implemented method of claim 2, further comprising selecting the first level and the second level from a plurality of provisioning levels and selecting the first and the second personalization profiles from a plurality of personalization profiles.

7. The computer-implemented method of claim 1, further comprising receiving the request from an issuer, the request originating from an issuer app of a mobile device of the consumer.

8. The computer-implemented method of claim 1, further comprising receiving, by the server computing device, over the payment transactions network, a request from an acquiring entity to authorize, clear, and settle a transaction using the PL token.

9. The computer-implemented method of claim 1, further comprising selecting the partner merchant from a plurality of partner merchants on the payment transactions network.

10. The computer-implemented method of claim 1, wherein the partner merchant includes a single partner merchant and the payment transactions network includes a closed loop network.

11. A server computer device that improves processing of payment transactions involving partnership offers, the partnership offers indicating transaction customized or varying terms, different interchange arrangements between parties, or enabling installment type payments to consumers, the payment transaction processing to process the payment transactions involving the partnership offers without first requiring the payment transactions to be taken off the payment processing network, comprising:
a processor; and
a non-transitory computer readable storage medium coupled to the processor and to store instructions which, when executed by the processor, cause the server computer device to:
store in a storage device communicatively coupled to a payment transactions network, a private label (PL) token range assignment file that maps a single primary account number (PAN) range to at least two or more token ranges, the PL token range assignment file comprising:
a plurality of primary account number (PAN) ranges,
a first plurality of token account ranges mapped to the plurality of primary PAN ranges, the first plurality of token account ranges associated with first product characteristics comprising a financial product identification (ID); and a second plurality of token account ranges mapped to the first plurality of token account ranges, the second plurality of token account ranges associated with second product characteristics including a private label (PL) partnership offer;

correlate a PAN account range of the plurality of primary PAN ranges to any one of the first plurality of token account ranges;

correlate a token account range of the first plurality of token account ranges to any one of the second plurality of token account ranges;

receive, over the payment transactions network, a request for a private label (PL) token to be used for a payment transaction associated with a primary account number (PAN) of a payment card and the PL partnership offer between a partner merchant and an issuer, the request originating from an issuer application executing on a mobile device of a consumer;

retrieve from the storage device, a first value from the plurality of primary PAN ranges in the PL token range assignment file based on the PAN;

retrieve from the storage device, a second value from the first plurality of token account ranges in the PL token range assignment file based on the first value;

retrieving from the storage device, a third value from the second plurality of token account ranges in the PL token range assignment file based on the second value;

generate a PL token from at least the first value, the second value and the third value to provision the PL token from multiple levels; and notify the partner merchant and the issuer of activation of the PL token so that the partner merchant activates the PL token on the mobile device through a partner merchant digital wallet to identify the partnership offer to parties of the payment transaction;

receive, by the server computer device, an authorization request generated once the consumer initiates a payment transaction with the partner merchant using the payment card of the issuer, the authorization request including the PAN and the PL token;

forward, by the server computer device, the authorization request to a POS device of the partner merchant; and receive, by the server computer device, clearing information including product characteristics associated with the PL token to clear the payment transaction based on terms in the partnership agreement between partner merchant and the issuer to allow the payment transaction to be processed without removal of the payment transaction the payment transactions network.

12. The server computer device of claim 11, wherein the instructions further cause the server computer device to establish a secure channel over the payment transactions network and to receive the request for the PL token via a partner digital wallet of the partner merchant over the secure channel.

13. The server computer device of claim 11, wherein the server computer device is coupled to a token vault comprising a secure storage to store the private label (PL) token range assignment file.

14. The server computer device of claim 13, wherein the product characteristics associated with the partnership offer include details of a customized agreement between the partner merchant and the issuer including promotional credit terms for a consumer associated with the payment card.

15. A system for improving processing of payment transactions involving partnership offers, the partnership offers indicating transaction customized or varying terms, different interchange arrangements between parties, or enabling installment type payments to consumers, the payment transaction processing to process the payment transactions involving the partnership offers without first requiring the payment transactions to be taken off the payment processing network, the system comprising:

a network interface device that receives a request for a private label (PL) token associated with a partnership offer between a partner merchant and an issuer;

a storage device that stores a private label (PL) token range assignment file that maps a single primary account number (PAN) range to at least two or more token ranges, the PL token range assignment file comprising:

a plurality of primary account number (PAN) ranges, and a first plurality of token account ranges mapped to the plurality of primary PAN ranges, the first plurality of token account ranges associated with first product characteristics comprising the financial product identification (ID); and a second plurality of token account ranges mapped to the first plurality of token account ranges, the second plurality of token account ranges associated with second product characteristics including a private label (PL) partnership offer, a PAN account range of the plurality of primary PAN ranges is correlated to any one of the first plurality of token account ranges, and a token account range of the first plurality of token account ranges is correlated to any one of the second plurality of token account ranges;

a server device that receives, over the payment transactions network from an issuer application executing on a mobile device of a consumer, a request for a private label (PL) token to be used for a payment transaction associated with a primary account number (PAN) of a payment card and the PL partnership offer between a partner merchant and the issuer;

a token activator executed by the server device and coupled to the network interface device and coupled to the storage device to activate the PL token by:

retrieving from the storage device, a first value from the plurality of primary PAN ranges in the PL token range assignment file based on the PAN;

retrieving from the storage device, a second value from the first plurality of token account ranges in the PL token range assignment file based on the first value;

retrieving from the storage device, a third value from the second plurality of token account ranges in the PL token range assignment file based on the second value;

generating a PL token from at least the first value, the second value, and the third value to provision the PL token at multiple provisioning levels according to the first product characteristics associated and the second product characteristics;

notifying the partner merchant and the issuer of the PL token so that the partner merchant activates the PL token on the mobile device through a partner merchant digital wallet, the PL token identifying the partnership offer to parties of the payment transaction;

receiving an authorization request generated once the consumer initiates a payment transaction with the partner merchant using the payment card of the issuer, the authorization request including the PAN and the PL token;

forwarding the authorization request to a POS device of the partner merchant; and receiving clearing information including product characteristics associated with the PL token to clear the payment transaction based on terms in the partnership agreement between partner merchant and the issuer, such that the payment transaction from the POS device is processed without removal of the payment transaction from the payment transactions network.

16. The system of claim 15, wherein the system receives via the network interface device, a request from an acquiring entity to process a payment transaction using the PL token and is to identify the partnership offer via the multiple provisioning levels of the PL token.

17. The system of claim 16, wherein the request from the acquiring entity is sent in response to an authorization request received by the acquiring entity from a point-of-sale (POS) device of the merchant.

18. The system of claim 17, wherein the authorization request is based at least in part on a unique private label identification (PLAID) that enables the POS device to recognize the PL token.

* * * * *